United States Patent
Rowell

(10) Patent No.: US 10,596,958 B2
(45) Date of Patent: Mar. 24, 2020

(54) METHODS AND SYSTEMS FOR PROVIDING ALERTS OF OPENING DOORS

(71) Applicant: Toyota Research Institute, Inc., Los Altos, CA (US)

(72) Inventor: Todd J. Rowell, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 51 days.

(21) Appl. No.: 15/883,272

(22) Filed: Jan. 30, 2018

(65) Prior Publication Data

US 2019/0232863 A1    Aug. 1, 2019

(51) Int. Cl.
*B60Q 1/52* (2006.01)
*B60Q 1/26* (2006.01)
*B60R 21/0134* (2006.01)
*B60Q 1/50* (2006.01)
*B60R 21/0132* (2006.01)

(52) U.S. Cl.
CPC ........... *B60Q 1/525* (2013.01); *B60Q 1/2669* (2013.01); *B60Q 1/503* (2013.01); *B60R 21/0132* (2013.01); *B60R 21/0134* (2013.01); *B60R 2021/01345* (2013.01)

(58) Field of Classification Search
CPC ...... B60Q 1/525; B60Q 1/2669; B60Q 1/503; B60R 21/0132; B60R 21/0134; B60R 2021/01345
See application file for complete search history.

(56) References Cited

U.S. PATENT DOCUMENTS

| 8,650,799 | B2 | 2/2014 | Chen |
| 9,511,730 | B1 * | 12/2016 | Wu .................. G08G 1/166 |
| 2009/0033474 | A1 | 2/2009 | Chen |

(Continued)

FOREIGN PATENT DOCUMENTS

| CN | 201677807 | 12/2010 |
| CN | 204109892 | 1/2015 |
| WO | 2016194144 | 12/2016 |

OTHER PUBLICATIONS

"The New Audi A4 Is the Car That Could Save a Cyclist's Life" http://www.news.com.au/technology/innovation/motoring/the-new-audi-a4-is-the-car-that-could-save-a-cyclists-life/news-story/99ffc2a7c52edde8fe3062d4bb7bfa8a Accessed/Published Date: Mar. 6, 2016.

(Continued)

*Primary Examiner* — Phung Nguyen
(74) *Attorney, Agent, or Firm* — Dinsmore & Shohl LLP

(57) ABSTRACT

Vehicle systems for providing alerts of opening doors are disclosed. A system includes a camera configured to output image data of a vehicle occupant, an external environment sensor configured to output an external environment sensor output signal, one or more processors communicatively coupled to the camera and the external environment sensor, one or more memory modules communicatively coupled to the one or more processors, and machine readable instructions stored in the one or more memory modules. The system receives the image data of the vehicle occupant, predicts whether a door of the vehicle is going to be opened based on the image data of the vehicle occupant, determines whether an object is present based on the external environmental sensor output signal, and generates an alert in response to predicting that the door of the vehicle is going to be opened and determining that the object is present.

19 Claims, 6 Drawing Sheets

(56) References Cited

U.S. PATENT DOCUMENTS

| | | | |
|---|---|---|---|
| 2010/0087990 A1* | 4/2010 | Allen | B60R 11/04 |
| | | | 701/45 |
| 2012/0194356 A1 | 8/2012 | Haines et al. | |
| 2013/0088578 A1* | 4/2013 | Umezawa | G08G 1/166 |
| | | | 348/47 |
| 2013/0234844 A1 | 9/2013 | Yopp | |
| 2013/0275008 A1* | 10/2013 | Breed | E05F 15/77 |
| | | | 701/49 |
| 2016/0208537 A1* | 7/2016 | Senguttuvan | B60W 50/0098 |
| 2017/0021759 A1 | 1/2017 | Zhang et al. | |
| 2017/0218678 A1* | 8/2017 | Kothari | E05F 15/73 |
| 2017/0291535 A1* | 10/2017 | Arcand | B60Q 1/346 |
| 2017/0369016 A1* | 12/2017 | Gurghian | E05F 15/40 |
| 2017/0371347 A1* | 12/2017 | Cohen | G05D 1/0088 |
| 2018/0044963 A1* | 2/2018 | Gomez Melchor | E05F 15/40 |
| 2018/0124515 A1* | 5/2018 | Lopez | H04R 5/02 |
| 2018/0174450 A1* | 6/2018 | Im | B60K 35/00 |
| 2018/0238098 A1* | 8/2018 | Rhode | E05F 15/73 |
| 2019/0126815 A1* | 5/2019 | Morel | G09G 5/003 |

OTHER PUBLICATIONS

"Product—Dooring Alert Systems" http://dooringalertsystems.com/ Accessed/Published Date: May 8, 2017.

\* cited by examiner

METHODS AND SYSTEMS FOR PROVIDING ALERTS OF OPENING DOORS

TECHNICAL FIELD

The present specification generally relates to vehicle systems for providing alerts of opening doors and, more specifically, to vehicle systems that provide alerts when it is predicted that a vehicle door is going to be opened within the predetermined time.

BACKGROUND

When a vehicle occupant opens a door of a vehicle, the door may hit an object if the object is close to the door, or is approaching the door. For example, a bicycle rider passing by the vehicle may hit the door when the door is opened. In some instances, it may be desirable to generate an alert that a vehicle door is predicted to be opened.

SUMMARY

In one embodiment, a system includes a camera configured to output image data of a vehicle occupant, an external environment sensor configured to output an external environment sensor output signal, one or more processors communicatively coupled to the camera and the external environment sensor, one or more memory modules communicatively coupled to the one or more processors, and machine readable instructions stored in the one or more memory modules. The system receives the image data of the vehicle occupant, predicts whether a door of the vehicle is going to be opened based on the image data of the vehicle occupant, determines whether an object is present based on the external environmental sensor output signal, and generates an alert in response to predicting that the door of the vehicle is going to be opened and determining that the object is present.

In another embodiment, a method for providing an alert includes receiving, from a camera of a vehicle, image data of a vehicle occupant, predicting whether a door of the vehicle is going to be opened based on the image data of the vehicle occupant, determining whether an object is present based on an external environmental sensor output signal, and generating the alert in response to predicting that the door of the vehicle is going to be opened and determining that the object is present.

In another embodiment, a system for a vehicle includes a camera configured to output image data of a vehicle occupant, one or more processors communicatively coupled to the camera, one or more memory modules communicatively coupled to the one or more processors, and machine readable instructions stored in the one or more memory modules. The machine readable instructions, when executed by the one or more processors, cause the system to: receive the image data of the vehicle occupant, predict whether a door of the vehicle is going to be opened based on the image data of the vehicle occupant, and generate an alert in response to predicting that the door of the vehicle is going to be opened.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
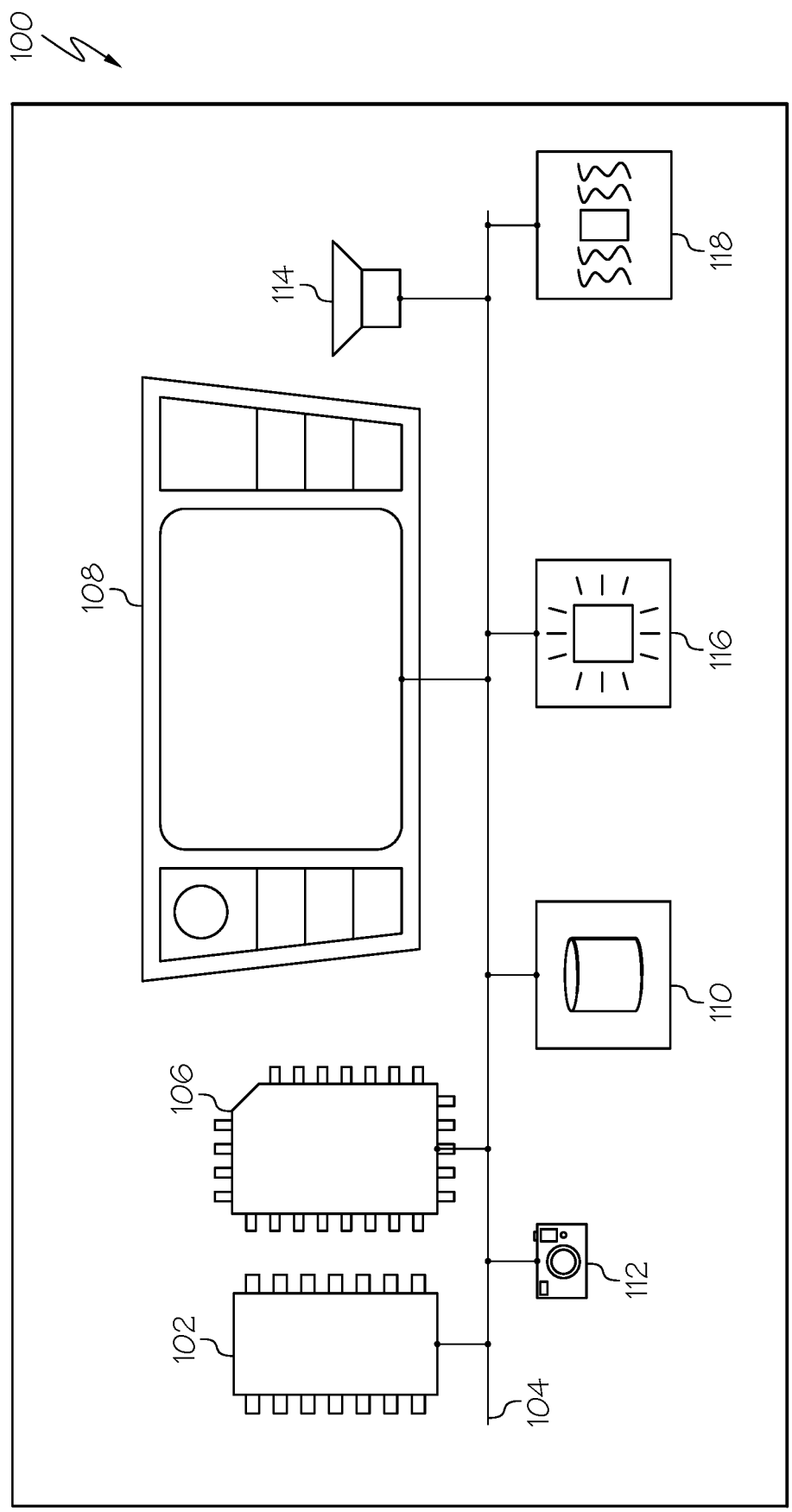
FIG. 1 schematically depicts an embodiment of a vehicle system for providing alerts of opening doors, according to one or more embodiments shown and described herein.

The embodiments disclosed herein include vehicle systems for providing alerts of opening doors. Referring generally to FIG. 1, a system includes a camera configured to output image data of a vehicle occupant, an external environment sensor configured to output an external environment sensor output signal, one or more processors communicatively coupled to the camera and the external environment sensor, one or more memory modules communicatively coupled to the one or more processors, and machine readable instructions stored in the one or more memory modules. The system receives the image data of the vehicle occupant, predicts whether a door of the vehicle is going to be opened based on the image data of the vehicle occupant, determines whether an object is present based on the external environmental sensor output signal, and generates an alert in response to predicting that the door of the vehicle is going to be opened and determining that the object is present.

Referring to FIG. 1, an embodiment of a vehicle system 100 for providing alerts of opening doors is schematically depicted. It is noted that, while the vehicle system 100 is depicted in isolation, the vehicle system 100 may be included within a vehicle, for example, within the vehicle 200 of FIG. 2. In embodiments in which the vehicle system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the vehicle system 100 may be embodied within a mobile device (e.g., smartphone, laptop computer, etc.) carried by an occupant of the vehicle.

Still referring to FIG. 1, the vehicle system 100 includes one or more processors 102. Each of the one or more processors 102 may be any device capable of executing machine readable instructions. For example, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, it should be understood that the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. In embodiments, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 100 further includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The one or more memory modules 106 may be non-transient memory modules. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored in the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include instructions for processing images received from one or more cameras 112. For example, the one or more processors 102 implement the instructions in the one or more memory modules 106 to process an image from the one or more cameras 112 to identify a pose or an action of a vehicle occupant. Any image processing technology may be used to process images from the one or more cameras 112. The identified pose or action may include, but is not limited to, holding a steering wheel, playing audio, operating a gear stick, locking a seatbelt, unlocking a seat belt, pushing a window operating button, unlocking a door, contacting a door knob, twisting an upper body, etc.

In some embodiments, the one or more memory modules 106 may store sample images for various poses or actions of a vehicle occupant. The one or more processors 102 may compare images received from the one or more cameras 112 to the sample images in the one or more memory modules 106 using image recognition processing, and determine the pose or an action of the vehicle occupant based on the comparison. For example, if the image from the one or more cameras 112 corresponds to a sample image of unlocking a seat belt, the one or more processors 102 may determine the action of the vehicle occupant as unlocking a seat belt.

Referring still to FIG. 1, the vehicle system 100 comprises one or more environmental sensors 110 configured to detect and monitor objects within a threshold distance from a vehicle. For example, the one or more environmental sensors 110 may be configured to detect and monitor objects within 10 meters from the vehicle. The one or more environmental sensors 110 may be any sensors configured to detect an object, including, for example, cameras, laser sensors, proximity sensors, LIDAR sensors, ultrasonic sensors, and the like. For example, the one or more environmental sensors 110 may be any device having an array of sensing devices (e.g., pixels) capable of detecting radiation in an ultraviolet wavelength band, a visible light wavelength band, or an infrared wavelength band. The one or more environmental sensors 110 may have any resolution. The one or more environmental sensors 110 may include an omni-directional camera, or a panoramic camera. In some embodiments, one or more optical components, such as a mirror, fish-eye lens, or any other type of lens may be optically coupled to the one or more environmental sensors 110. The one or more environmental sensors 110 may be used to capture an image of objects proximate to the vehicle 200. The one or more environmental sensors 110 may include a proximity sensor that detects a distance between the proximity sensor and an object nearby and communicates the proximity information to the one or more processors 102. The proximity sensor may be any device capable of outputting a proximity signal indicative of a distance of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like.

Figure 2A:
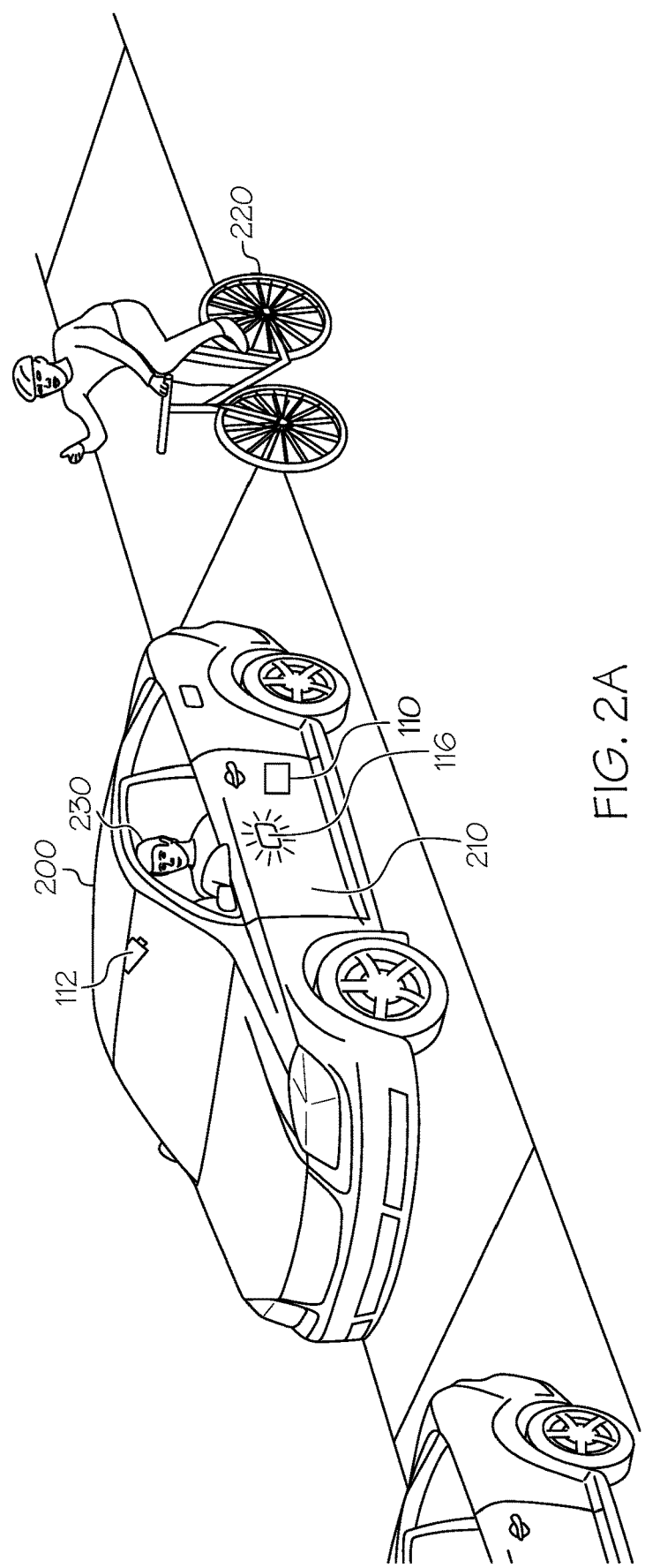
FIG. 2A depicts a scenario of providing an alert to an object approaching a vehicle when a vehicle occupant of the vehicle is going to open a door, according to one or more embodiments shown and described herein.

In some embodiments, the one or more environmental sensors 110 may determine location information about objects relative to the vehicle 200. For example, as shown in FIG. 2A, the one or more environmental sensors 110 may determine that a bicycle 220 is located 5 meters from the vehicle 200, and located at the back of the vehicle 200. FIG. 2A depicts an embodiment of providing an alert to an object approaching a vehicle 200 when a vehicle occupant 230 of the vehicle 200 is going to open a door 210. The one or more environmental sensors 110 may be located on the door 210 of the vehicle. The one or more environmental sensors 110 may be located in any other location, for example, at the back of the vehicle 200, at the front of the vehicle 200, at the top of the vehicle 200, etc. The one or more environmental sensors 110 may detect the speed and moving direction of objects within the threshold distance. For example, the one or more environmental sensors 110 may detect the speed of the bicycle 220 in FIG. 2A and the moving direction of the bicycle 220 relative to the moving direction of the vehicle 200. In some embodiments, the one or more environmental sensors 110 may detect an object approaching the vehicle 200 or the door 210 of the vehicle 200.

Referring still to FIG. 1, the vehicle system 100 includes a screen 108 for providing visual output such as, for example, maps, navigation, entertainment, or a combination thereof. The screen 108 may be located on the head unit of the vehicle such that a vehicle occupant (e.g., the vehicle occupant 230 in FIG. 2A) of the vehicle may easily see the screen 108 while seated in the driver seat. The screen 108 may provide an alert to the vehicle occupant when the one or more processors 102 determine that the door of the vehicle is going to be opened within a predetermined time, and an object detected by the one or more environmental sensors 110 is approaching the door.

The screen 108 is coupled to the communication path 104. Accordingly, the communication path 104 communicatively couples the screen 108 to other modules of the vehicle system 100 including, without limitation, the one or more processors 102 and/or one or more memory modules 106. The screen 108 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 108 may be a touch screen that, in addition to visually displaying information, detects the presence and location of a tactile input upon a surface of or adjacent to the screen 108. In some embodiments, the screen 108 may display the locations of the vehicle 200 and objects within the threshold distance from the vehicle 200 on a scaled map based on data received from the one or more environmental sensors 110.

Still referring to FIG. 1, the vehicle system 100 further includes one or more cameras 112. Each of the one or more cameras 112 is coupled to the communication path 104 and communicatively coupled to the one or more processors 102. Each of the one or more cameras 112 may be any device having an array of sensing devices capable of detecting radiation in an ultraviolet wavelength band, a visible light wavelength band, or an infrared wavelength band. In embodiments, the one or more cameras 112 may be an omni-directional camera, or a panoramic camera, for example. The one or more cameras 112 may be used to capture an image of the vehicle occupant 230, as shown in FIG. 2A.

The vehicle system 100 further includes a speaker 114 coupled to the communication path 104 such that the communication path 104 communicatively couples the speaker 114 to other modules of the vehicle system 100. The speaker 114 transforms data signals from the vehicle system 100 into audible mechanical vibrations. The speaker 114 may warn the driver by providing audible sound when the one or more processors 102 determine that the door 210 of the vehicle 200 is going to be opened within a predetermined time, and an object detected by the one or more environmental sensors 110 is approaching the door 210. For example, the speaker 114 may provide audible sound "Be careful of opening the door. A bicycle is approaching."

The vehicle system 100 comprises an external output device 116 coupled to the communication path 104 such that the communication path 104 communicatively couples the external output device 116 to other modules of the vehicle system 100. The external output device 116 may be located on the surface of the vehicle 200 as shown in FIG. 2A. In embodiments, the external output device 116 may include a lighting device that turns on or blinks when the one or more processors 102 determine that the door 210 of the vehicle 200 is going to be opened within a predetermined time, and the object detected by the one or more environmental sensors 110 is approaching the door. In some embodiments, the external output device 116 may include a speaker, similar to the speaker 114, that provides audible feedback when the one or more processors 102 determine that the door 210 of the vehicle 200 is going to be opened within a predetermined time, and the object detected by the one or more environmental sensors 110 is approaching the door 210.

Figure 2B:
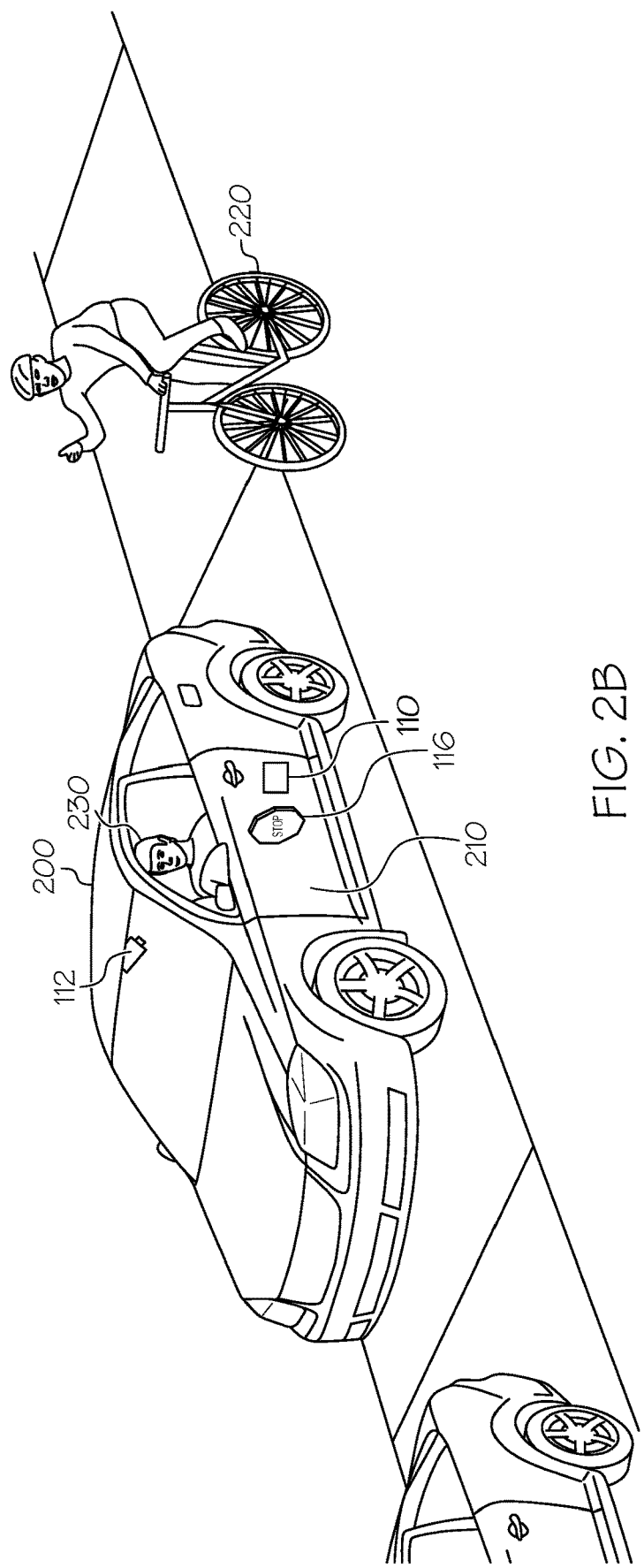
FIG. 2B depicts another scenario of providing an alert to an object approaching a vehicle when a vehicle occupant of the vehicle is going to open a door, according to one or more embodiments shown and described herein.

In some embodiments, the external output device 116 may include a mechanical device that protrudes from the body of the vehicle 200 when the one or more processors 102 determine that the door 210 of the vehicle 200 is going to be opened within a predetermined time, and the object detected by the one or more environmental sensors 110 is approaching the door. For example, the external output device 116 may unfold an alert sign, e.g., "stop," "alert," etc. to be visible to the bicycle rider, as shown in FIG. 2B.

The vehicle system 100 further comprises a tactile feedback device 118. The tactile feedback device 118 may be any device capable of providing tactile feedback to a user. The tactile feedback device 118 may include a vibration device (such as in embodiments in which tactile feedback is delivered through vibration), or a pressure generating device (such as in embodiments in which the tactile feedback is delivered through generated pressure). The tactile feedback device 118 may be attached to a vehicle seat such that the vehicle occupant 230 can feel the tactile feedback provided by the tactile feedback device 118. The tactile feedback device 118 may warn the driver by providing tactile feedback when the one or more processors 102 determine that the door 210 of the vehicle 200 is going to be opened within a predetermined time, and the object detected by the one or more environmental sensors 110 is approaching the door 210.

Still referring to FIG. 1, in embodiments, the vehicle system 100 can be formed from a plurality of modular units, i.e., the screen 108, the one or more environmental sensors 110, the tactile feedback device 118, and the speaker 114, can be formed as modules communicatively coupled to one another to form the vehicle system 100. Accordingly, in some embodiments, each of the modules can include at least one of the one or more processors 102 and/or the one or more memory modules 106. It is noted that, while specific modules may be described herein as including one or more processors 102 and/or one or more memory modules 106, the embodiments described herein can be implemented with the one or more processors 102 and the one or more memory modules 106 distributed throughout various communicatively coupled modules.

The one or more processors 102 may implement instructions for predicting whether the door 210 of the vehicle 200 is going to be opened within a predetermined time based on the identified action of the vehicle occupant 230. For example, if the identified action of the vehicle occupant 230 is the vehicle occupant 230 contacting a door knob for the door 210, the one or more processors 102 may predict that the door 210 of the vehicle 200 is going to be opened within a predetermined time, e.g., within one second. As another example, if the identified action of the vehicle occupant 230 is the vehicle occupant 230 unlocking a seatbelt, the one or more processors 102 may predict that the door 210 of the vehicle 200 is going to be opened within a predetermined time.

The one or more memory modules 106 may store a list of actions that may bring about an opening door event within the predetermined time. For example, the list of actions may include unlocking a seat belt, contacting a door knob, and any actions that may be conducted right before a vehicle occupant would open a door. The list of actions may be updated by monitoring the actions of the vehicle occupant 230 and a detection of the door that is opened within the predetermined time of the identified action. For example, if the one or more cameras 112 captured that the vehicle occupant twisted his upper body toward the door, and a door sensor of the vehicle detects the door opening within the predetermined time, an action of twisting an upper body toward a door may be added to the list of actions stored in the one or more memory modules 106.

The one or more processors 102 may implement instructions for generating an alert in response to predicting that the door 210 of the vehicle 200 is going to be opened within the predetermined time. For example, the one or more processors 102 may instruct the speaker 114 to generate an audible alert in response to predicting that the door 210 of the vehicle 200 is going to be opened within the predetermined time. As another example, the one or more processors 102 may instruct the external output device 116 to blink in response to predicting that the door 210 of the vehicle 200 is going to be opened within the predetermined time.

Figure 3:
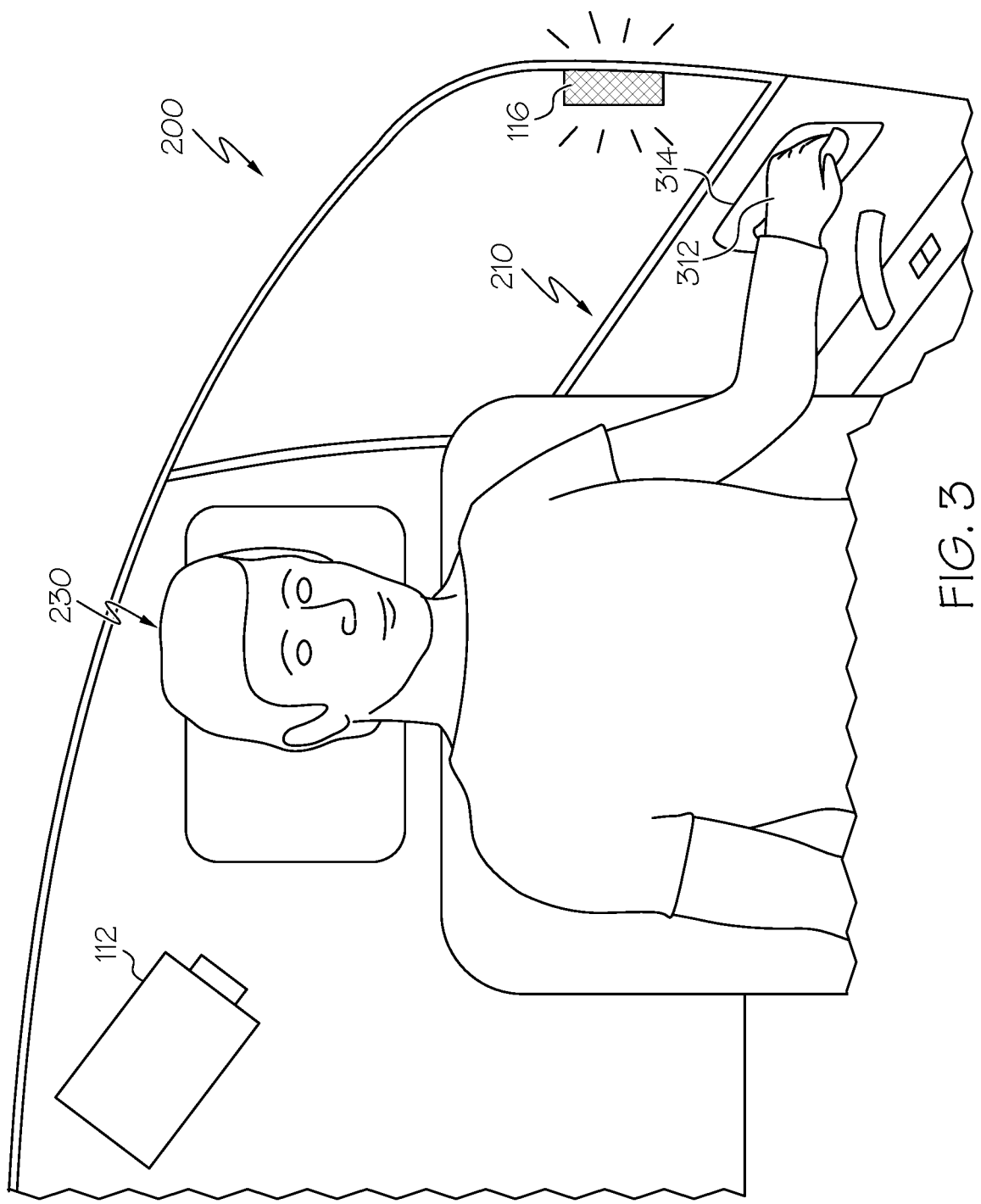
FIG. 3 depicts a scenario of predicting that the door of a vehicle is going to be opened and providing an alert, according to one or more embodiments shown and described herein.

FIG. 3 depicts generating an alert in response to predicting that the door 210 of the vehicle 200 is going to be opened within the predetermined time, according to one or more embodiments shown and described herein. In embodiments, the one or more cameras 112 of the vehicle system 100 capture the image of the vehicle occupant 230. The one or more processors 102 receive and process the captured image to identify an action of the vehicle occupant 230. For example, the one or more processors 102 may identify, by processing the captured image, that a hand 312 of the vehicle occupant 230 is proximate to or touches a door knob 314 of the vehicle 200. Based on the identified action of the vehicle occupant 230, e.g., grabbing the door knob 314 or approaching the door knob 314, the one or more processors 102 may predict that the door 210 of the vehicle 200 is going to be opened within a predetermined time.

Once it is predicted that the door 210 of the vehicle 200 is going to be opened, the one or more processors 102 may instruct the external output device 116 to output an alert. For example, the one or more processors 102 may instruct the external output device 116 to light up, make an alert sound, or unfold an alert sign such that objects proximate to the vehicle 200 may predict an opening door event.

In some embodiments, the one or more processors 102 may determine whether an object outside the vehicle (e.g., the bicycle 220) is present within a predetermined distance from the door 210 based on signals from the one or more environmental sensors 110. Once it is predicted that the door 210 of the vehicle 200 is going to be opened and it is determined that an object is present within a predetermined distance from the door 210, the one or more processors 102 may instruct the screen 108 or the speaker 114 to provide an alert to the vehicle occupant 230. For example, the one or more processors 102 may instruct the screen 108 to display an alert sign to notify the vehicle occupant 230 of the object within the predetermined distance from the door 210. As another example, the one or more processors 102 may instruct the speaker 114 to output an alert sound, or a voice alert e.g., "A bicycle is within 5 meters."

Figure 4:
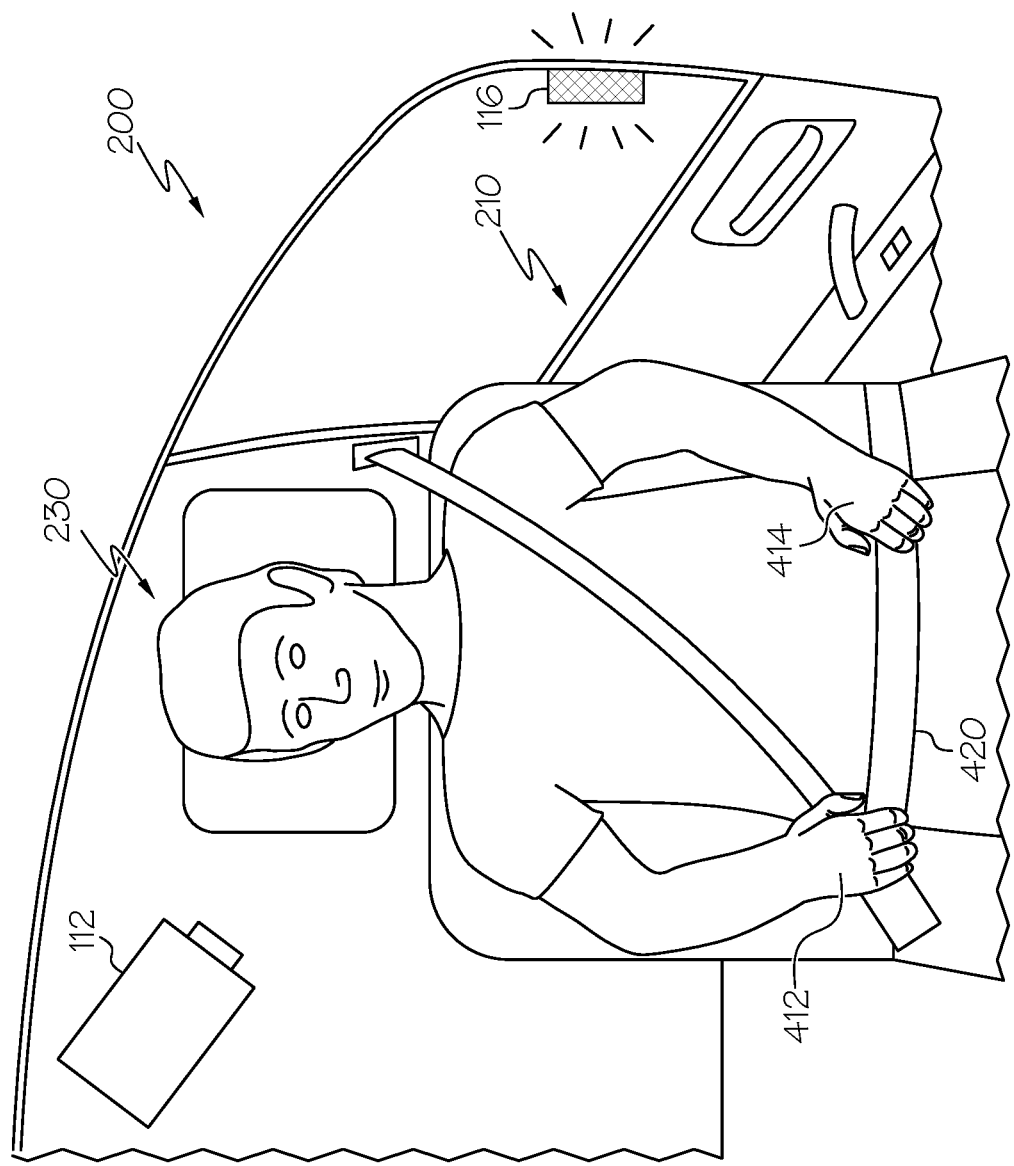
FIG. 4 depicts another scenario of predicting that the door of a vehicle is going to be opened and providing an alert, according to one or more embodiments shown and described herein.

FIG. 4 depicts generating an alert in response to predicting that the door 210 of the vehicle 200 is going to be opened within the predetermined time, according to one or more embodiments shown and described herein. In embodiments, the one or more cameras 112 of the vehicle system 100 capture the image of the vehicle occupant 230. The one or more processors 102 receive and process the captured image to identify an action of the vehicle occupant 230. For example, the one or more processors 102 may identify, by processing the captured image, that a right hand 412 of the vehicle occupant 230 is proximate to or touches a seat belt buckle and a left hand 414 of the vehicle occupant 230 is proximate to or touches a seat belt 420. Based on the identified action of the vehicle occupant 230, e.g., grabbing or approaching the seat belt buckle, the one or more processors may predict that the door 210 of the vehicle 200 is going to be opened within a predetermined time.

Once it is predicted that the door 210 of the vehicle 200 is going to be opened, the one or more processors 102 may instruct the external output device 116 to output an alert. For example, the one or more processors 102 may instruct the external output device 116 to light up, make an alert sound, or unfold an alert sign such that objects proximate to the vehicle 200 may predict an opening door event.

In some embodiments, the one or more processors 102 may determine whether an object outside the vehicle (e.g., the bicycle 220) is present within a predetermined distance from the door 210 based on signals from the one or more environmental sensors 110. Once it is predicted that the door 210 of the vehicle 200 is going to be opened and it is determined that an object is present within a predetermined distance from the door 210, the one or more processors 102 may instruct the screen 108 or the speaker 114 to provide an alert to the vehicle occupant. For example, the one or more processors 102 may instruct the screen 108 to display an alert sign to notify the vehicle occupant 230 of the object within the predetermined distance from the door 210. As another example, the one or more processors 102 may instruct the speaker 114 to output an alert sound, or a voice alert.

Figure 5:
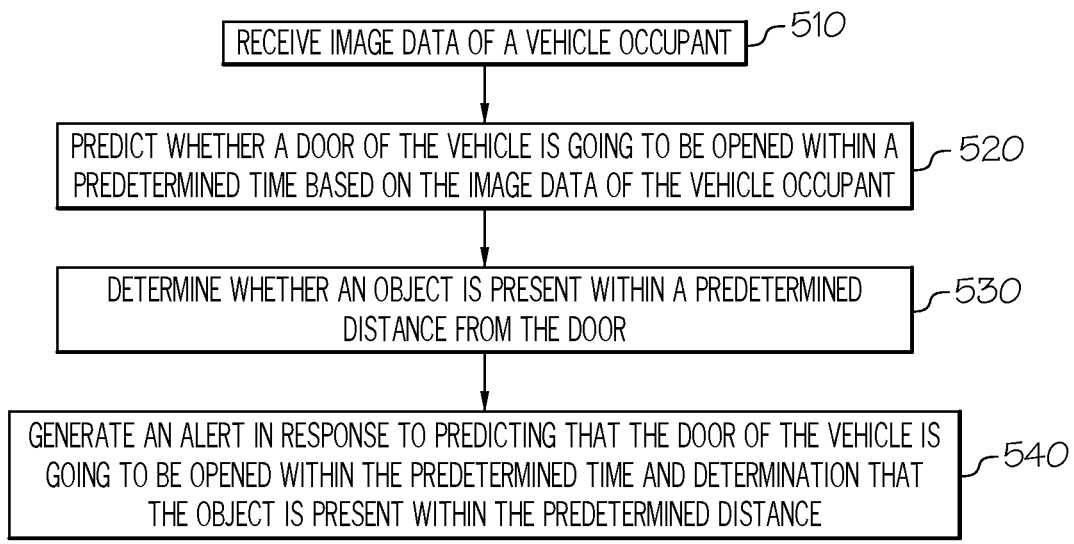
FIG. 5 depicts a flowchart of generating alerts of an opening door, according to one or more embodiments shown and described herein.

FIG. 5 depicts a flowchart of generating an alert with respect to a door opening, according to one or more embodiments shown and described herein. In step 510, the one or more processors 102 of the vehicle system 100 receive the image data of a vehicle occupant from the one or more cameras 112.

In step 520, the one or more processors 102 predicts whether a door of the vehicle is going to be opened within a predetermined time based on the image data of the vehicle occupant. In embodiments, the one or more processors 102 process the image from the one or more cameras 112 to identify a pose or an action of the vehicle occupant, and predict whether a door of the vehicle is going to be opened within a predetermined time based on the identified pose or action of the vehicle occupant. Any image processing technology may be used to process images from the one or more cameras 112. The identified pose or action may include holding a steering wheel, playing audio, operating a gear stick, locking a seatbelt, unlocking a seat belt, pushing a window operating button, unlocking a door, contacting a door knob, twisting an upper body, etc.

The one or more memory modules 106 may store a list of actions that are followed by an opening door event within the predetermined time. The list of actions may include unlocking a seat belt, contacting a door knob, and any actions that may be conducted right before the vehicle occupant would open a door. The one or more processors 102 may predict that the door of the vehicle is going to be opened within the predetermined time if the identified action of the vehicle occupant is included in the list of actions stored in the one or more memory modules 106. For example, if the identified action of the vehicle occupant is the vehicle occupant contacting the door knob of the vehicle, the one or more processors 102 may predict that the door of the vehicle is going to be opened within the predetermined time because the action of contacting a door knob is included in the list of actions stored in the one or more memory modules 106.

In step 530, the one or more processors 102 determine whether an object is present within a predetermined distance from the door of the vehicle based on signals from the one or more environmental sensors 110.

In step 540, the one or more processors 102 generates an alert in response to predicting that the door of the vehicle is going to be opened within the predetermined time and determining that the object is present within the predetermined distance. For example, the one or more processors 102 may instruct the external output device 116 to light up, make an alert sound, or unfold an alert sign. As another example, the one or more processors 102 may instruct the speaker 114 to make an alert sound, the screen 108 to display alerts, and/or the tactile feedback device 118 to provide tactile feedback alerts. In some embodiments, the one or more processors 102 may lock the door of the vehicle in response to predicting that the door of the vehicle is going to be opened within the predetermined time and determining that the object is present within the predetermined distance from the door in order to prevent the vehicle occupant from opening the door.

It should be understood that embodiments described herein are directed to systems for providing alerts of opening doors. The system includes a camera configured to output image data of a vehicle occupant, an external environment sensor configured to output an external environment sensor output signal, one or more processors communicatively coupled to the camera and the external environment sensor, one or more memory modules communicatively coupled to the one or more processors, and machine readable instructions stored in the one or more memory modules. The system receives the image data of the vehicle occupant, predicts whether a door of the vehicle is going to be opened based on the image data of the vehicle occupant, determines whether an object is present based on the external environmental sensor output signal, and generates an alert in response to predicting that the door of the vehicle is going to be opened and determining that the object is present. Because the system predicts whether the door of the vehicle is going to be opened by monitoring the action of the vehicle occupant, the system enhances the accuracy of predicting opening door events. In addition, the vehicle system described herein provides alerts of opening door events in advance of potential accidents or collisions based on the monitored action of the vehicle occupant.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for a vehicle comprising:
    a camera configured to output image data of a vehicle occupant;
    an external environment sensor configured to output an external environment sensor output signal;
    one or more processors communicatively coupled to the camera and the external environment sensor;
    one or more memory modules communicatively coupled to the one or more processors; and
    machine readable instructions stored in the one or more memory modules that, when executed by the one or more processors, cause the system to:
        receive the image data of the vehicle occupant;
        predict whether a door of the vehicle is going to be opened within a predetermined time based on the image data of the vehicle occupant;
        determine whether an object is present within a threshold distance from the vehicle based on the external environment sensor output signal; and
        display locations of the vehicle and the object on a scaled map in response to predicting that the door of the vehicle is going to be opened within the predetermined time and determining that the object is present within the threshold distance from the vehicle.

2. The system of claim 1, wherein the machine readable instructions stored in the one or more memory modules cause the system to:
    process the image data to identify an action of the vehicle occupant; and
    predict whether the door of the vehicle is going to be opened based on the identified action of the vehicle occupant.

3. The system of claim 2, wherein the machine readable instructions stored in the one or more memory modules cause the system to lock the door in response to predicting that the door of the vehicle is going to be opened and determining that the object is present within the threshold distance from the vehicle.

4. The system of claim 2, wherein the machine readable instructions stored in the one or more memory modules cause the system to predict that the door of the vehicle is going to be opened if the identified action is one of the predetermined actions stored in the one or more memory modules.

5. The system of claim 4, wherein the predetermined actions include an action of contacting a door knob of the vehicle and an action of unlocking a seat belt for the vehicle occupant.

6. The system of claim 4, wherein the machine readable instructions stored in the one or more memory modules cause the system to update the predetermined actions based on the identified action of the vehicle occupant and a detection of the door opening.

7. The system of claim 1, further comprising an external output device communicatively coupled to the one or more processors and configured to generate an alert in response to predicting that the door of the vehicle is going to be opened and determining that the object is present within the threshold distance from the vehicle.

8. The system of claim 7, wherein the external output device is configured to unfold an alert sign in response to predicting that the door of the vehicle is going to be opened and determining that the object is present within the threshold distance from the vehicle.

9. The system of claim 7, wherein the external output device includes a lighting device configured to turn on in response to predicting that the door of the vehicle is going to be opened and determining that the object is present within the threshold distance from the vehicle.

10. The system of claim 7, wherein the external output device includes a speaker configured to provide an audible alert in response to predicting that the door of the vehicle is going to be opened and determining that the object is present within the threshold distance from the vehicle.

11. The system of claim 1, further comprising an in-vehicle output device communicatively coupled to the one or more processors and configured to generate an alert in response to predicting that the door of the vehicle is going to be opened and determining that the object is present within the threshold distance from the vehicle.

12. The system of claim 11, wherein the in-vehicle output device includes a screen configured to display the alert in response to predicting that the door of the vehicle is going to be opened and determining that the object is present within the threshold distance from the vehicle.

13. The system of claim 11, wherein the in-vehicle output device includes a speaker configured to provide an audible alert in response to predicting that the door of the vehicle is going to be opened and determining that the object is present within the threshold distance from the vehicle.

14. The system of claim 1, wherein the machine readable instructions stored in the one or more memory modules cause the system to:
generate an alert in response to predicting that the door of the vehicle is going to be opened and determining that the object is present within the threshold distance from the vehicle.

15. A method, comprising:
receiving, from a camera of a vehicle, image data of a vehicle occupant;
predicting whether a door of the vehicle is going to be opened within a predetermined time based on the image data of the vehicle;
determining whether an object is present within a threshold distance from the vehicle based on an external environmental sensor output signal; and
displaying locations of the vehicle and the object on a scaled map in response to predicting that the door of the vehicle is going to be opened within the predetermined time and determining that the object is present within the threshold distance from the vehicle.

16. The method of claim 15, wherein predicting whether the door of the vehicle is going to be opened based on the image data of the vehicle occupant comprises:
processing the image data to identify an action of the vehicle occupant; and
predicting whether the door of the vehicle is going to be opened based on the identified action of the vehicle occupant.

17. The method of claim 16, further comprising:
locking the door in response to predicting that the door of the vehicle is going to be opened and determining that the object is present within the threshold distance from the vehicle.

18. The method of claim 17, wherein predicting whether the door of the vehicle is going to be opened based on the identified action of the vehicle occupant comprises predicting that the door of the vehicle is going to be opened if the identified action is one of predetermined actions stored in one or more memory modules.

19. The method of claim 15, further comprising:
generating an alert in response to predicting that the door of the vehicle is going to be opened and determining that the object is present within the threshold distance from the vehicle.

* * * * *